US012691035B2

(12) United States Patent
Canestraro

(10) Patent No.: US 12,691,035 B2
(45) Date of Patent: Jul. 28, 2026

(54) SUPPORT DEVICE FOR SUPPORTING A PLURALITY OF CONTAINERS FOR PHARMACEUTICAL USE TO BE HANDLED IN A PROCESSING LINE

(71) Applicant: NUOVA OMPI S.R.L. Unipersonale, Piombino Dese (IT)

(72) Inventor: Marco Canestraro, Carmignano di Brenta (IT)

(73) Assignee: NUOVA OMPI S.R.L. UNIPERSONALE, Piombino Dese (IT)

( * ) Notice: Subject to any disclaimer, the term of this patent is extended or adjusted under 35 U.S.C. 154(b) by 24 days.

(21) Appl. No.: 18/356,792

(22) Filed: Jul. 21, 2023

(65) Prior Publication Data

US 2024/0024195 A1 Jan. 25, 2024

(30) Foreign Application Priority Data

Jul. 25, 2022 (IT) ........................ 102022000015591

(51) Int. Cl.
*A61J 1/16* (2023.01)
*B65D 25/10* (2006.01)

(52) U.S. Cl.
CPC .............. *A61J 1/16* (2013.01); *B65D 25/107* (2013.01); *B65D 25/108* (2013.01)

(58) Field of Classification Search
CPC ........ B65D 25/107; B65D 25/108; A61J 1/16; A61M 5/008
USPC ............... 220/737, 507, 518, 517, 516, 514; 211/85.13, 71.01, 74; 206/366, 369, 370, 206/364, 365, 438
See application file for complete search history.

(56) References Cited

U.S. PATENT DOCUMENTS 3,918,920 A * 11/1975 Barber ...................... B01L 9/06 206/591
5,004,103 A * 4/1991 Connors .................. B25H 3/06 206/372
7,910,067 B2 * 3/2011 Knight ...................... B01L 9/06 422/562
10,207,832 B2 2/2019 Narvekar et al.
10,399,768 B2 * 9/2019 Bertolin ................. B65D 71/70
11,286,095 B2 * 3/2022 Kloke ........................ B01L 9/06
2005/0214924 A1 * 9/2005 Glaser .................... C12M 37/00 435/252.1
2017/0348476 A1 * 12/2017 Thompson ............ B65D 71/70
2018/0057249 A1 3/2018 Bertolin
2018/0126066 A1 5/2018 Narvekar et al.
2018/0208377 A1 * 7/2018 Kloke ..................... B65B 3/003
(Continued)

*Primary Examiner* — Rafael A Ortiz
*Assistant Examiner* — Jenine Spicer
(74) *Attorney, Agent, or Firm* — Husch Blackwell LLP

(57) ABSTRACT

A support device for supporting a plurality of containers for pharmaceutical use to be handled in a processing line includes a plate having a plurality of housing seats configured to house the containers, each housing seat including a support base configured to support the containers and a side wall extended from the base along a longitudinal direction. The base includes at least three rest elements projecting inwardly in the housing seat and equally spaced from each other. The side wall includes a plurality of centering ribs extended along the longitudinal direction and projecting inwardly in the housing seat. A pair of centering ribs is arranged above a respective rest element.

8 Claims, 9 Drawing Sheets

(56) References Cited

U.S. PATENT DOCUMENTS

| | | | |
|---|---|---|---|
| 2019/0343721 | A1 | 11/2019 | Komann et al. |
| 2020/0338258 | A1 | 10/2020 | Standley |

* cited by examiner

SUPPORT DEVICE FOR SUPPORTING A PLURALITY OF CONTAINERS FOR PHARMACEUTICAL USE TO BE HANDLED IN A PROCESSING LINE

CROSS REFERENCES

This application is a U.S. Application claiming priority to Italian Application No. 102022000015591 filed on Jul. 25, 2022, the disclosure of which is incorporated herein by reference in its entirety.

TECHNICAL FIELD

The present disclosure relates to a support device for supporting a plurality of containers for pharmaceutical use to be handled in a processing line.

BACKGROUND

The support device of the present disclosure meets the definition of "nest" of ISO 21881:2019 standard.

Although explicit reference will be made in this description and the following claims to containers for pharmaceutical use, the support device of the disclosure is also suitable for supporting containers for medical, cosmetic or veterinary use.

For simplicity of discussion, in the present description all the containers that be supported by the support device of the disclosure are also indicated with the term "primary containers".

Non-limiting examples of primary containers are vials, ampoules, cartridges and syringes.

In the present description and in the appended figures specific reference will be made, as a non-limiting example of primary containers, to the cartridges.

As known, the primary containers are often handled in the processing lines by aggregating them into a secondary container called "nest".

In accordance with ISO 21881:2019 standard, the nest comprises a plate made of plastic material on which a plurality of housing seats configured to house primary containers are made. These housing seats are distributed in the plate according to a predetermined layout and are shaped so as to stably support the primary containers, keeping them separated from each other and thus avoiding possible mutual collisions.

It is also known to aggregate the primary containers into a so-called "nest and tub" configuration, in which the primary containers are placed inside the housing seats of a nest and the nest is in turn placed inside a tray so-called "tub". This configuration is particularly suitable for supporting and handling the primary containers during the various processing steps to which they are subjected along the processing line, such as washing, packaging, sterilization, filling, capping, crimping, freeze-drying, storage, manual or automated inspection operations, etc.

U.S. Ser. No. 10/207,832 B2 describes a nest in which each housing seat comprises a base defined by four rest elements configured to support a respective cartridge and a side wall from which eight centering ribs for centering the cartridges extend into the housing seats. The rest elements are equally spaced from each other. Analogously, the centering ribs are equally spaced from each other. A centering rib is arranged at a central zone of a respective rest element and another centering rib is arranged between each pair of adjacent rest elements.

The Applicant has noted that a sufficient number of centering ribs should be provided within each housing seat in order to ensure a stable positioning of the primary containers in the respective housing seats of the nest. According to the Applicant, such centering ribs must be at least six.

The Applicant therefore deems that a solution such as the one described in U.S. Ser. No. 10/207,832 B2, by providing in each housing seat eight centering ribs equally spaced from each other, actually allows to achieve a stable positioning of the cartridges within the housing seats.

However, the Applicant has noted that such stable positioning would inevitably be compromised if one of the abovementioned centering ribs is damaged or not correctly sized. In this case, in fact, the two centering ribs that are adjacent to the damaged or incorrectly sized centering rib would be sufficiently distant from each other and would therefore not be able to prevent displacements of the cartridge towards the side wall portion in which the damaged or incorrectly sized centering rib is provided.

The technical problem underlying the present disclosure is to provide a support device suitable for ensuring a stable positioning of the primary containers within the housing seats even in the case that one of the centering ribs typically provided in the housing seats is damaged or not correctly sized.

SUMMARY

The present disclosure therefore relates to a support device for supporting a plurality of containers for pharmaceutical use to be handled in a processing line, comprising a plate having a plurality of housing seats configured to house said containers, wherein each housing seat comprises a base configured to support said containers and a side wall extended from said base along a longitudinal direction, said base comprising at least three rest elements projecting inwardly in said housing seat and equally spaced from each other, said side wall comprising a plurality of centering ribs extended along said longitudinal direction and projecting inwardly in said housing seat, characterised in that said plurality of centering ribs comprises a pair of centering ribs arranged above a respective rest element.

In the present description and in the appended claims, the terms "upper" and "lower", and similar terms such as "above" and/or "below" and/or "over" and/or "under", if present, are used with reference to the position taken by the support device during handling in the processing line of the containers for pharmaceutical use arranged therein.

Thanks to the provision of two centering ribs at each rest element, each centering rib is in close proximity to another centering rib. In this way, if one of the abovementioned centering ribs is damaged or not correctly sized, the centering action is still effectively carried out by the other of the abovementioned centering ribs, thus ensuring in this way the desired stable positioning of the container inside the housing seat.

The Applicant also believes that the provision of two centering ribs above each rest element provides the support device with a greater structural stiffness than in the case where only one centering rib is provided on each rest element.

An embodiment of the present disclosure can have at least one of the preferred features recited in the dependent claims and described hereinbelow, wherein each of these features can be provided individually or in combination with the other preferred features.

Preferably, said centering ribs are arranged only above said at least three rest elements.

The Applicant has observed that this arrangement is particularly functional during the operations of insertion/extraction of the containers into/from the housing seats, both in the case of manual insertion/extraction and in the case of mechanized insertion/extraction. The Applicant has indeed found that during the abovementioned operations it is necessary to be able to access the spaces defined between pairs of adjacent rest elements and, since there are no centering ribs in the support device of the disclosure at the abovementioned spaces, access to said spaces is clear of obstacles or obstructions.

Preferably, each rest element comprises a first side connected to the side wall.

Preferably, each rest element comprises a second side arranged inside said housing seat in a distal position with respect to said side wall.

Preferably, the second side is shorter than the first side.

Preferably, each rest element comprises two opposite third sides connecting said first side to said second side.

Preferably, each centering rib of each pair of centering ribs is arranged at a respective third side of the respective rest element.

Therefore, the two centering ribs provided at each rest element are at a distance from each other substantially equal to the length of the abovementioned first side.

Preferably, each centering rib is connected to the respective rest element. In this way each pair of centering ribs strengthens the respective rest element.

Preferably, each centering rib comprises, at one of the free ends thereof that is distal from the respective rest element, a tapered portion.

This tapered portion facilitates the insertion of the container into the housing seat.

Preferably, said centering ribs extend on opposite sides with respect to said plate.

Preferably, said rest elements are four or six.

Preferably, said pairs of centering ribs are four or six.

Preferably, said plate comprises a flat surface which is perforated at said housing seats.

Preferably, said longitudinal direction is substantially orthogonal to said plane surface.

These aspects are merely an illustrative aspect of the innumerable aspects associated with the present disclosure and should not be deemed as limiting in any manner. These and other aspects, features and advantages of the present disclosure will become apparent from the following detailed description when taken in conjunction with the referenced figures.

BRIEF DESCRIPTION OF THE DRAWINGS

Further characteristics and advantages of the present disclosure will become clearer from the following detailed description of preferred embodiments thereof, which is made with reference to the accompanying drawings and given for indicative and non-limiting purposes. In such drawings.

DETAILED DESCRIPTION

Figure 1:
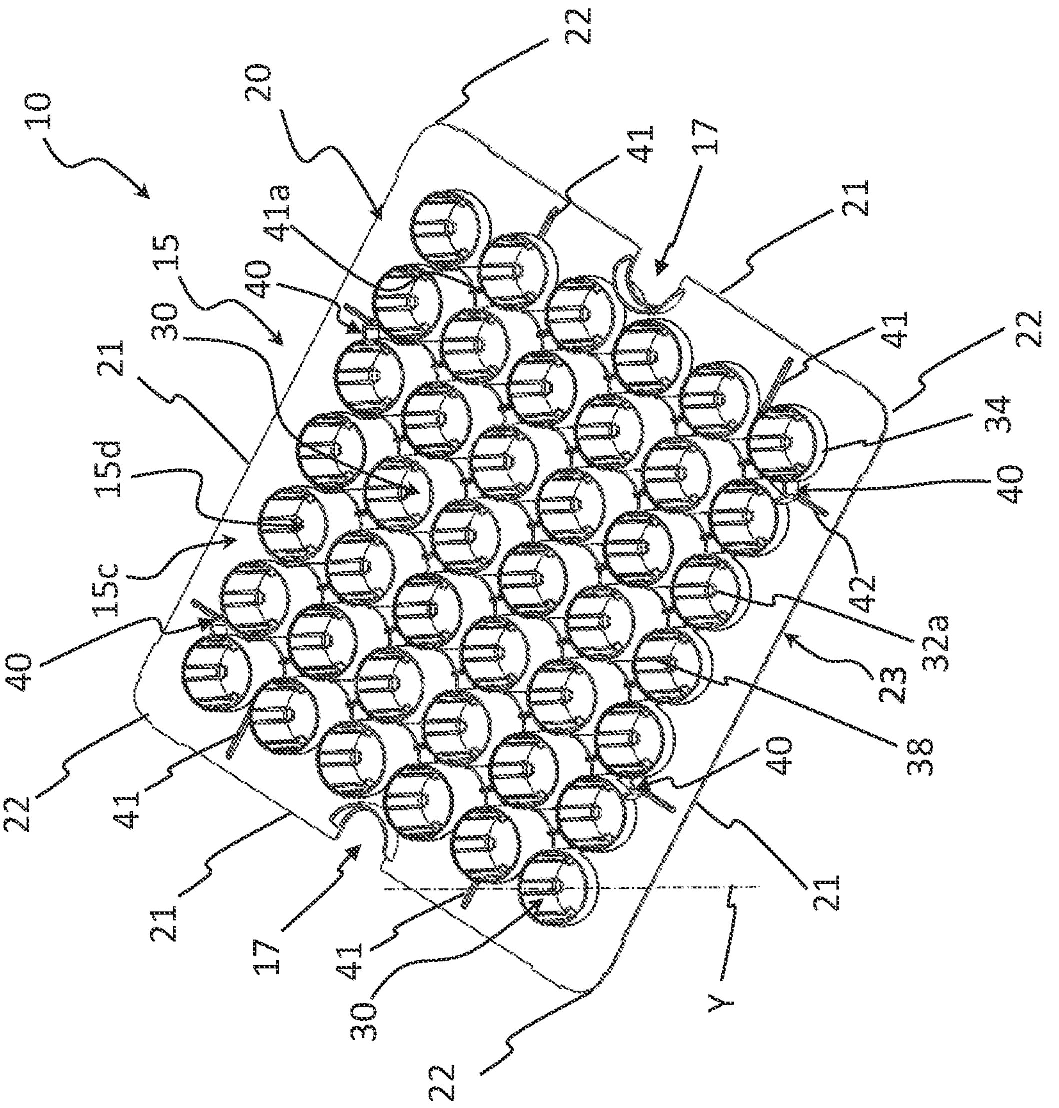
FIG. 1 is a schematic perspective top view of a first embodiment of a support device.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

In FIGS. 1-4, a first embodiment of a support device for supporting a plurality of containers for pharmaceutical use (not shown) in accordance with the present disclosure is indicated overall with 10.

These containers are intended to be handled in a processing line (not shown).

Preferably, the abovementioned containers are cartridges.

The support device 10 comprises a body 15 having a substantially quadrangular shape. In the non-limiting example described herein, the body 15 is defined by a plate 20 having a substantially rectangular shape. Said plate 20 has four sides 21 and four vertices 22, which are preferably rounded.

The plate 20 of the support device 10 can be made by moulding plastic material, for example polypropylene.

The plate 20 comprises a flat surface which is perforated at a plurality of housing seats 30 configured to house respective cartridges.

The housing seats 30 are distributed in the plate 20 according to a predetermined layout and are shaped so as to stably support the cartridges, keeping them separated from each other and thus avoiding possible mutual collisions.

In the non-limiting example of FIGS. 1-4 the housing seats 30 are arranged in the plate 20 along a plurality of parallel rows (or columns) (FIG. 1). The housing seats 30 may however be arranged according to a staggered honeycomb or checkerboard configuration, like for example in FIGS. 7 to 10.

A plurality of housing seats 30 are adjacent to the sides 21 of the plate 20 and are hereinafter referred to as "perimeter housing seats 30", while another plurality of housing seats 30 are arranged in the plate 20 in a central position with respect to the perimeter housing seats 30 and are hereinafter referred to as "central housing seats 30".

The body 15, and hence the plate 20, has a perimeter portion 15*c* delimited externally by the four sides 21 and by the four vertices 22 of the plate 20, and a central portion 15*d* delimited by the perimeter portion 15*c* and comprising the perimeter housing seats 30 and the central housing seats 30. The four sides 21 and the four vertices 22 form a perimeter edge 23 of the plate 20.

Each cartridge has a substantially cylindrical shape and comprises a substantially circular open or closed base surface and, on the opposite side to the base surface, a top surface provided with a through opening configured to allow the filling of the cartridge with a predetermined amount of a pharmaceutical product, in the exemplary and non-limiting case of cartridges for pharmaceutical use.

The cartridges are typically made of glass or of a thermoplastic material.

After having placed the cartridges of a production batch in the housing seats 30 of the support device 10 with their top surface turned downwards, an organized assembly of cartridges is obtained, that allows the simultaneous handling and processing of all the cartridges of the production batch.

The cartridges, in fact, upon being placed in the housing seats 30 of the support device 10, are moved along the processing line by handling the support device 10. At least part of this handling is carried out after having inserted the support device 10 into a tub (not shown).

To this end, the perimeter portion 15*c* of the plate 20 comprises a pair of opposite through slots 17 configured to facilitate the insertion and the extraction of the support device into/from the tub.

The tub has a substantially parallelepipedal or truncated-pyramidal shape and comprises a substantially flat bottom surface and four substantially flat side walls which are connected two by two by respective connecting walls.

An inner perimeter edge extends from the inner faces of the side walls and of the connecting walls inwardly in the tub. This inner perimeter edge defines an abutment surface on which the perimeter portion 15*c* of the plate 20 is intended to rest when the support device is placed inside the tub. The inner perimeter edge may be replaced by a plurality of ribs extending from the inner faces of the side walls and/or connecting walls, each rib comprising a rest surface defining a respective abutment surface on which the perimeter portion 15*c* of the plate 20 is intended to be rested.

Once the cartridges of a production batch are inserted into the housing seats 30 of the support device 10 and the latter is inserted into the tub, an aggregation configuration of the cartridges known as "nest and tub" is made, in which the support device 10 is the "nest" and the tub is the "tub".

As shown for example in FIG. 3, the housing seats 30 extend on opposite sides of the plate 20 between a lower surface 15*a* arranged below the plate 20 and an upper surface 15*b* that, in the specific example shown in the accompanying drawings, is arranged above the plate 20 but that in other embodiments can be defined by the upper face of the plate 20.

The lower surface 15*a* is substantially flat and is defined at lower ends 31*a* of the housing seats 30.

The upper surface 15*b* is also substantially flat and is defined at the upper ends 31*b* of the housing seats 30.

Each of the housing seats 30 comprises, at the lower end thereof 31*a*, a base 32 having a through opening 33 and, at the upper end thereof 31*b*, an end edge 35 defining a through opening 36 configured to allow the insertion and the extraction of a respective cartridge. The end edges 35 of the housing seats 30 project above the plate 20, all at the same height.

The base 32 has a predetermined thickness measured between a lower face of the base 32 that is configured to rest on a substantially horizontal operating surface of the processing line and that lies on the abovementioned lower surface 15*a* and an upper face of the base 32 that is configured to support the cartridge.

Each housing seat 30 further comprises a side wall 34 which, in the non-limiting example of FIGS. 1-4, is substantially cylindrical and delimits a substantially cylindrical space configured to receive the cartridge.

The side wall 34 extends starting from the base 32 up to the upper surface 15*b* of the plate 20 along a longitudinal axis Y that is substantially orthogonal to the abovementioned flat surface of the plate 20.

Figure 3:
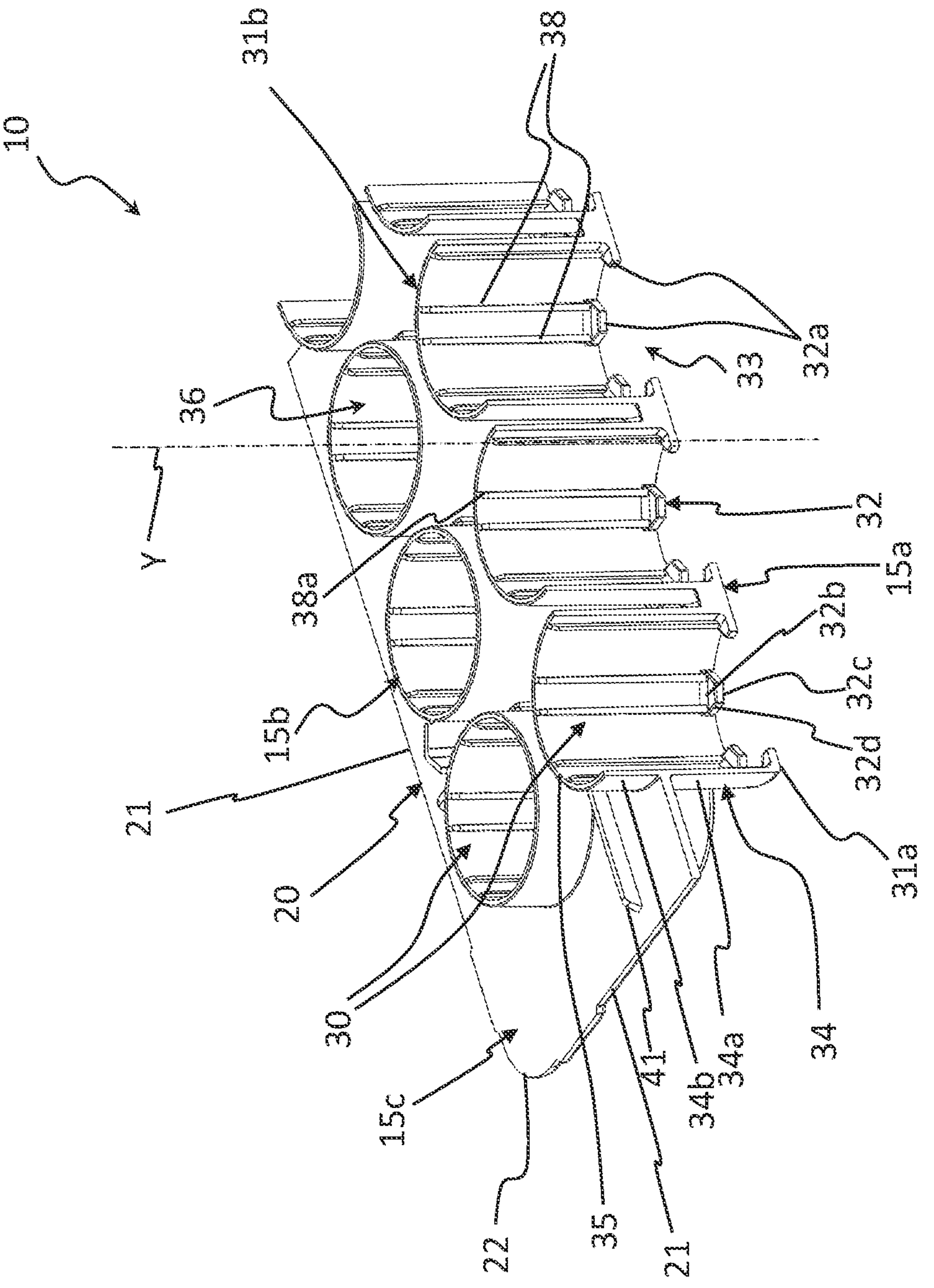
FIG. 3 is a schematic perspective view, in section and on an enlarged scale of a portion of the support device of FIG. 1.
Figure 4:
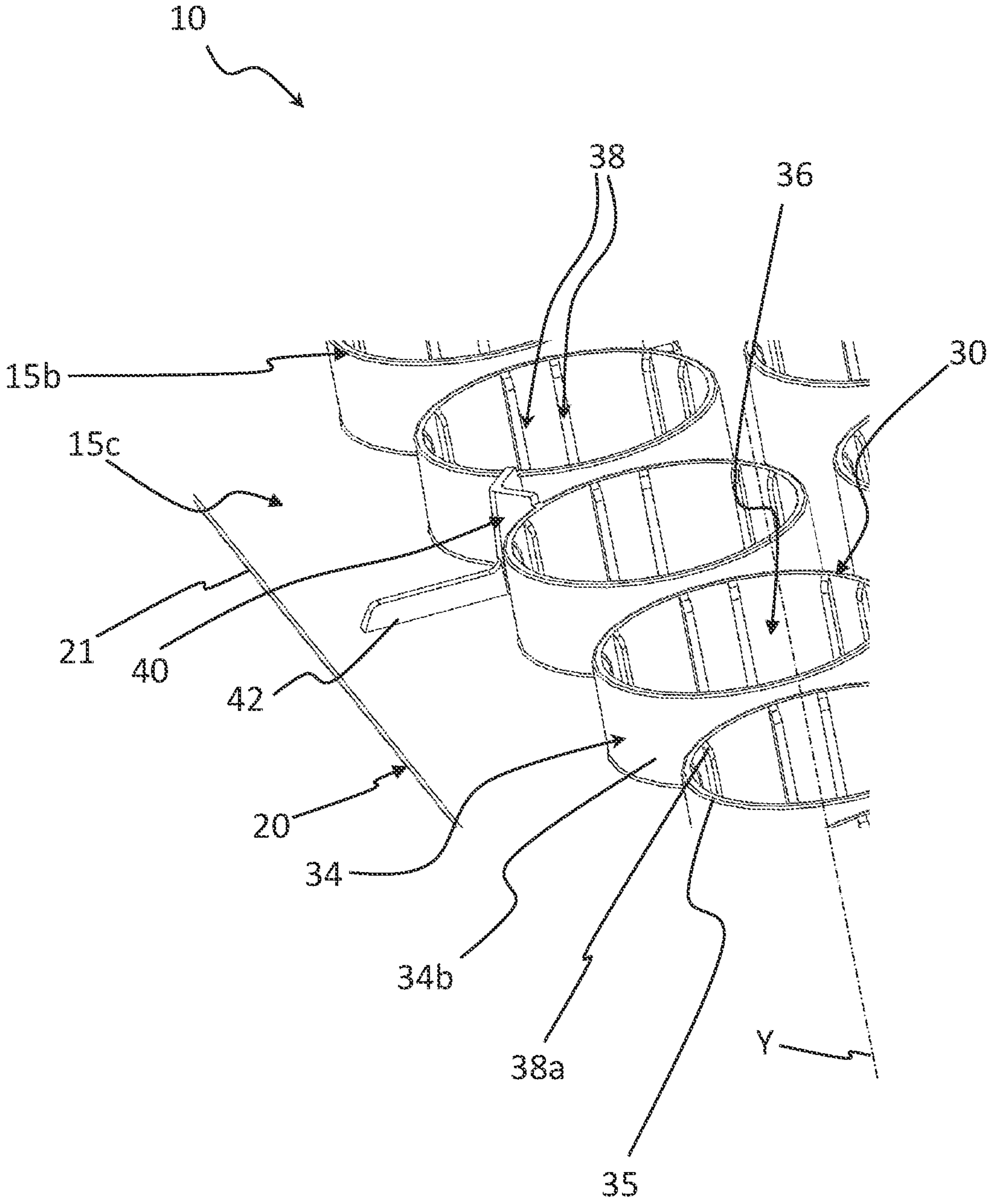
FIG. 4 is a schematic perspective view on an enlarged scale of a further portion of the support device of FIG. 1.

As shown for example in FIG. 3, the side walls 34 extend on opposite sides with respect to the plate 20. In this way, a lower portion 34*a* of the side wall 34 is placed below the plate 20 (i.e. on the side of the base 32) and an upper portion 34*b* of the side wall 34 is placed above the plate 20 (i.e. on the side of the upper end 31*b*).

In the non-limiting example of FIGS. 1-4, the base 32 is defined by six rest elements 32*a* projecting radially from the side wall 34 inwardly in the housing seat 30 and circumferentially equally spaced from each other, in particular arranged angularly offset by 60° from each other around the longitudinal axis Y. In other embodiments not shown, the rest elements are four and are angularly offset from each other by 90° or three and are angularly offset from each other by 120°.

In the present description and in the appended claims, the terms "axial" and the like are used to refer to a longitudinal direction of the housing seats 30 that is parallel to the longitudinal axis Y, the terms "radially" and the like are used to refer to any direction perpendicular to the abovementioned longitudinal axis Y, while the terms "circumferentially" and the like are used to refer to any circumferential direction about the abovementioned longitudinal axis Y.

Each rest element 32*a* has a quadrangular shape, substantially trapezoidal, and comprises a first side 32*b* connected to the side wall 34, a second side 32*c* arranged inside the housing seat 30 in a distal position with respect to the side wall 34 and preferably shorter than the first side 32*b* and two opposite third sides 32*d* connecting the first side 32*b* to the second side 32*c*.

To allow centering the cartridges within the respective housing seats 30, each housing seat 30 comprises a plurality of centering ribs 38 projecting radially from the tubular wall 34 inwardly in the housing seat 30 and extending along a longitudinal direction parallel to the longitudinal axis Y.

In the non-limiting example of FIGS. 1-4, the centering ribs 38 are twelve and have the same shape and dimensions as each other.

In general, the number of the centering ribs 38 is preferably even, so as to have a certain number of pairs of centering ribs 38, which in the non-limiting example of FIGS. 1-4 is six pairs.

Each pair of centering ribs 38 is arranged at and above a respective rest element 32*a* of the base 32.

The pairs of centering ribs 38 are circumferentially equally spaced from each other.

In the non-limiting example of FIGS. 1-4, the centering ribs 38 are arranged only above the rest elements 32*a*, so that in the circumferential spaces defined between pairs of adjacent rest elements 32*a* no centering ribs 38 are provided.

In particular, the centering ribs 38 of each pair of centering ribs 38 are arranged at the two third sides 32*d* of the respective rest element 32*a*.

In the non-limiting example of FIGS. 1-4, the centering ribs 38 extend on opposite sides with respect to the plate 20 between the rest elements 32*a* and the upper ends 31*b* of the housing seats 30.

Each centering rib 38 comprises, at a free end thereof that is distal from the respective rest element 32*a*, a tapered portion 38*a* configured to facilitate the insertion of the cartridge into the housing seat 30.

The support device 10 comprises a plurality of stacking elements 40 configured to allow stacking on the support device 10 another support device 10 of the same type.

In the non-limiting example of FIGS. 1-4, the stacking elements 40 are four and are arranged near two opposite sides 21 of the plate 20. The four stacking elements 40 are arranged substantially symmetrically with respect to a transverse centreline plane of the plate 20. In other embodiments that are not shown, the stacking elements 40 could be more or less than four, for example two or six.

Each stacking element 40 projects above the end edges 35 of the housing seats 30, and thus above the upper surface 15*b*.

In the non-limiting example of FIGS. 1-4, the stacking elements 40 are made in a single piece with the plate 20 and extend between the side walls 34 of two adjacent perimeter housing seats 30, in particular between the upper portions 34*b* of said two housing seats 30.

Each stacking element 40 is shaped like a “V”, with the vertex of the “V” facing toward the perimeter edge 23.

Each stacking element 40 is connected, at the vertex of the “V”, to a reinforcing rib 42 also arranged above the plate 20 and preferably made in a single piece with the stacking element 40 and the plate 20.

Further reinforcing ribs are arranged above the plate 20. In the non-limiting example of FIGS. 1-4, four further ribs 41 are arranged at the perimeter portion 15*c*, two of which are connected to the upper portions 34*b* of two perimeter housing seats 30. Further reinforcing ribs 41*a* are arranged at the central portion 15*d* between two respective adjacent housing seats 30.

In the preferred embodiment illustrated herein, the plate 20 comprises, on the lower surface 15*a*, one or more recesses 44 formed between two respective adjacent housing seats 30 configured to house respective stacking elements of another support device 10 of the same type.

Figure 2:
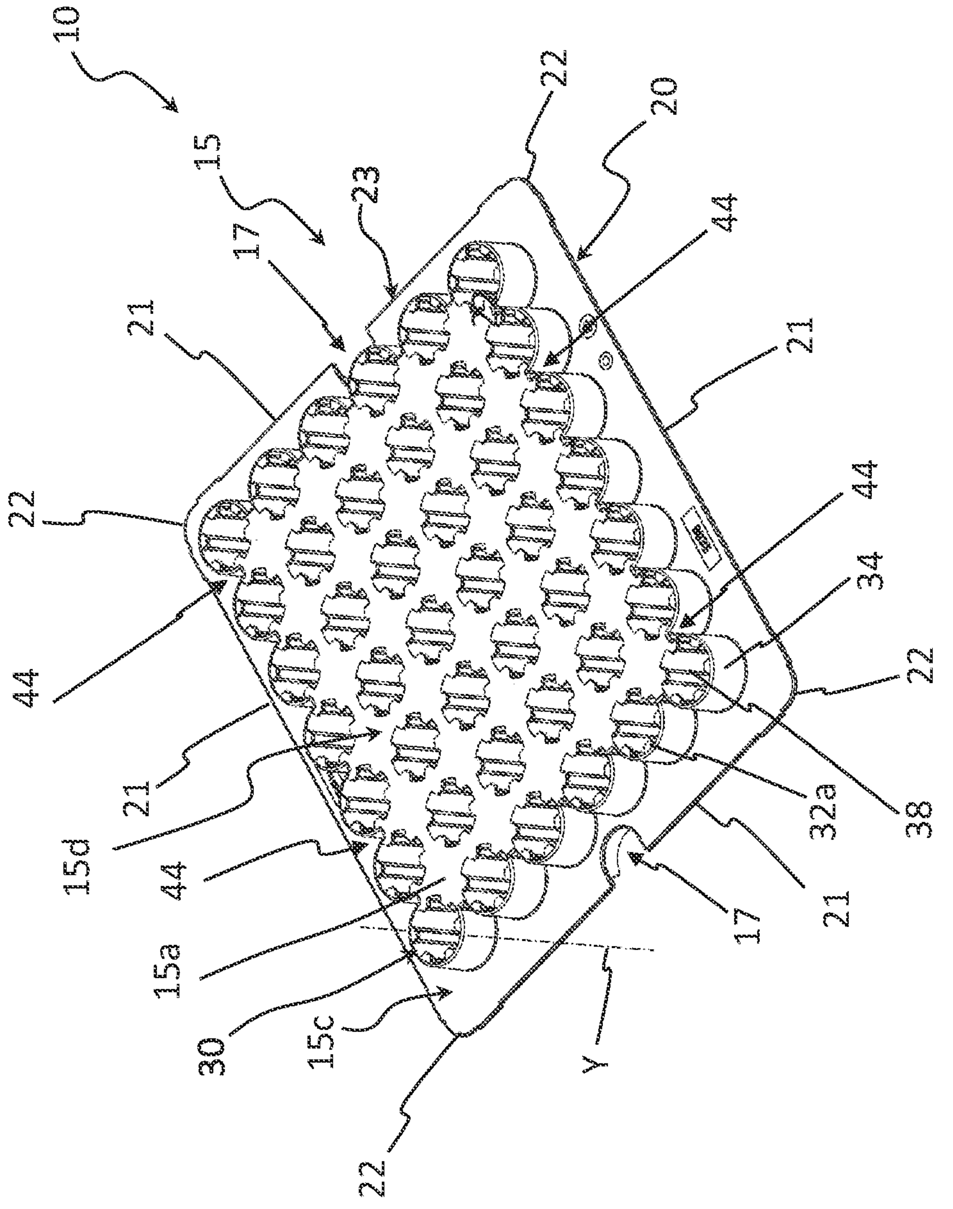
FIG. 2 is a schematic perspective bottom view of the support device of FIG. 1.

In particular, four recesses 44 are provided, each configured to house one of the abovementioned four stacking elements 40 (FIG. 2). Each recess 44 is defined between two lower portions 34*a* of the side walls 34 of two adjacent perimeter housing seats 30. The abovementioned recesses 44 are open towards the perimeter edge 23 of the plate 20.

The support device 10 described above can therefore be arranged both under another support device of identical type and over another support device of identical type, defining in both cases an assembly (or stack) of support devices which, thanks to the provision of stacking elements housed in respective recesses, is particularly stable.

Figure 5:
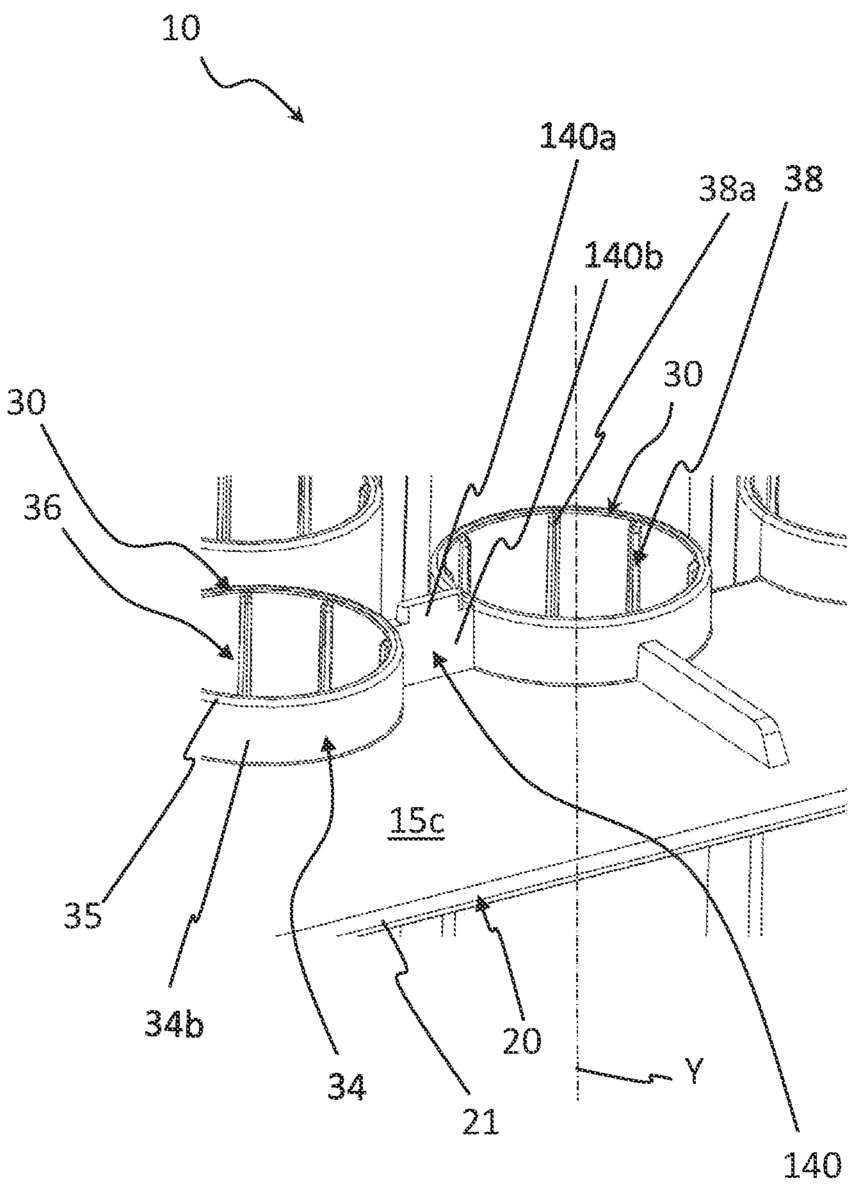
FIG. 5 is a schematic perspective view on an enlarged scale of a portion of a second embodiment of a support device.

A second embodiment of a support device 10 in accordance with the present disclosure is shown in FIG. 5. Parts and components that are identical or analogous to those of the support device 10 of FIGS. 1-4 are indicated by the same reference numeral and for their description reference is made to the above description.

The support device 10 of FIG. 5 differs from the support device 10 of FIGS. 1-4 in the stacking elements, indicated with 140, which in this case have a cross-section shaped like an “I” and which do not have respective reinforcing ribs analogous to the reinforcing ribs 42 described above with reference to FIGS. 1-4.

Each stacking element 140 comprises an upper portion 140*a* projecting above the end edges 35 of the housing seats 30, and therefore above the upper surface 15*b*, and that has a transverse length, measured along a direction orthogonal to the longitudinal axis Y, which is lower than the distance between the two housing seats 30 connected by the stacking element 140. Said upper portion 140*a* extends from a lower portion 140*b* of the stacking element 140 that extends between the plate 20 and the end edges 35 and that connects the abovementioned two housing seats 30. The transverse length of the lower portion 140*b* is therefore greater than that of the upper portion 140*a*.

In the non-limiting example of FIG. 5, four pairs of centering ribs 38, arranged above four rest elements (not shown) are provided.

Figure 6:
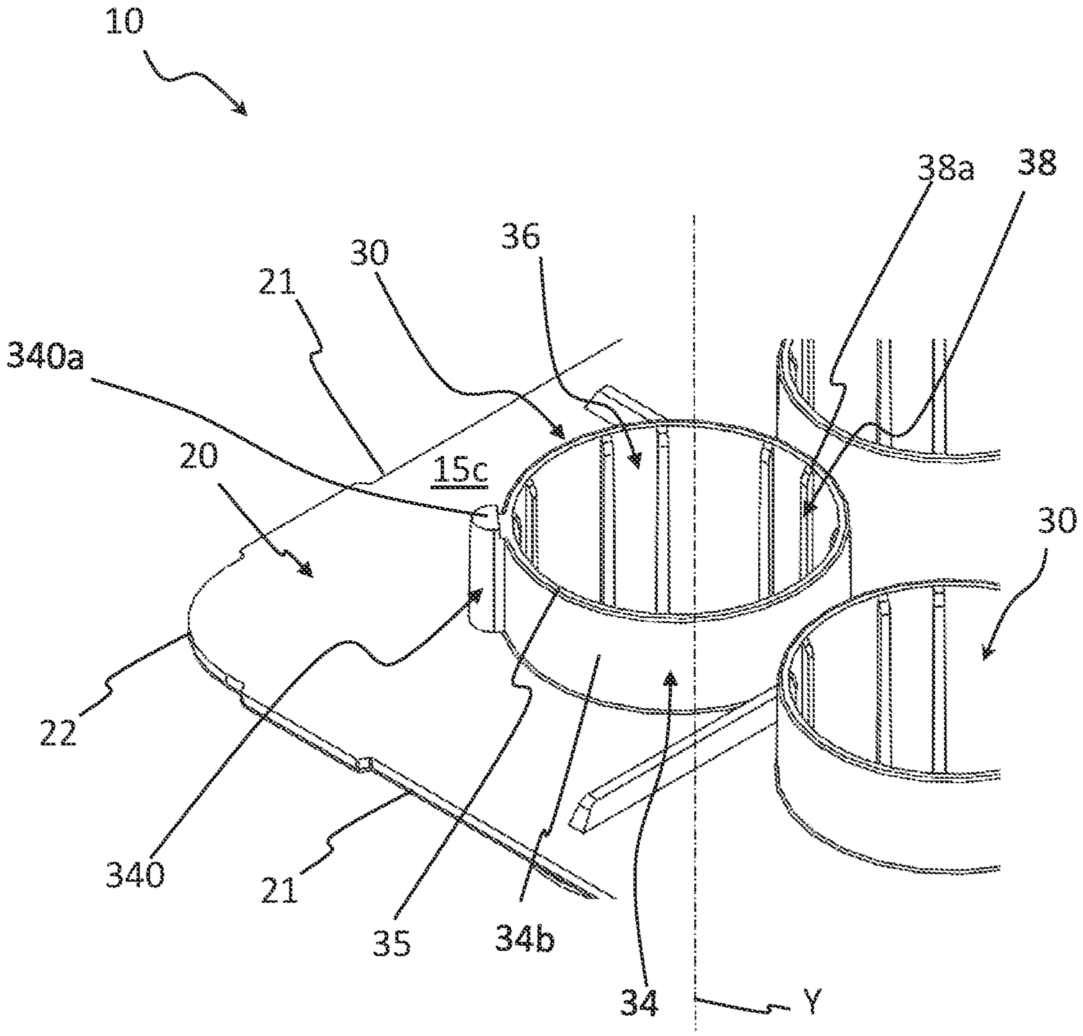
FIG. 6 is a schematic perspective view on an enlarged scale of a portion of a third embodiment of a support device.

A third embodiment of a support device 10 in accordance with the present disclosure is shown in FIG. 6. Parts and components that are identical or analogous to those of the support device 10 of FIGS. 1-4 are indicated by the same reference numeral and for their description reference is made to the above description.

Looking at the plate 20 of the support device 10 of FIG. 6 from above, it can be noted that it differs from the support device 10 of FIGS. 1-4 in the stacking elements, that in this case are defined by stacking elements 340 extending outwardly from the upper portion 34*b* of the side wall 34.

Each of the stacking elements 340 comprises a respective upper portion 340*a* projecting above the end edges 35 of the housing seats 30.

In particular, in the embodiment of FIG. 6, each of the four perimeter housing seats 30 arranged at the four vertices 22 of the plate 20 comprises a respective stacking element 340 facing toward the perimeter portion 15*c* of the plate 20 and having a substantially semi-cylindrical shape.

Figure 7:
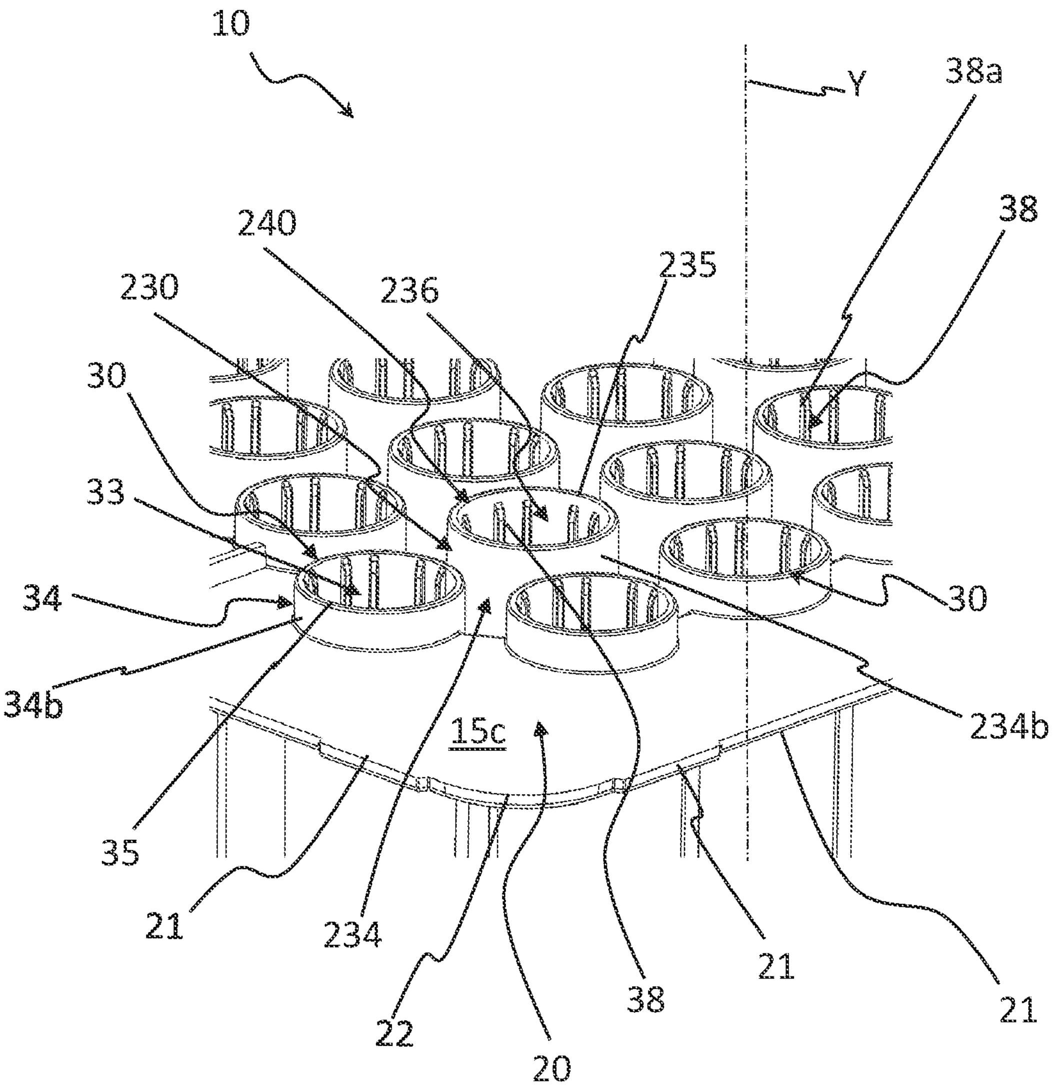
FIG. 7 is a schematic perspective view on an enlarged scale of a portion of a further embodiment of a support device.
Figure 8:
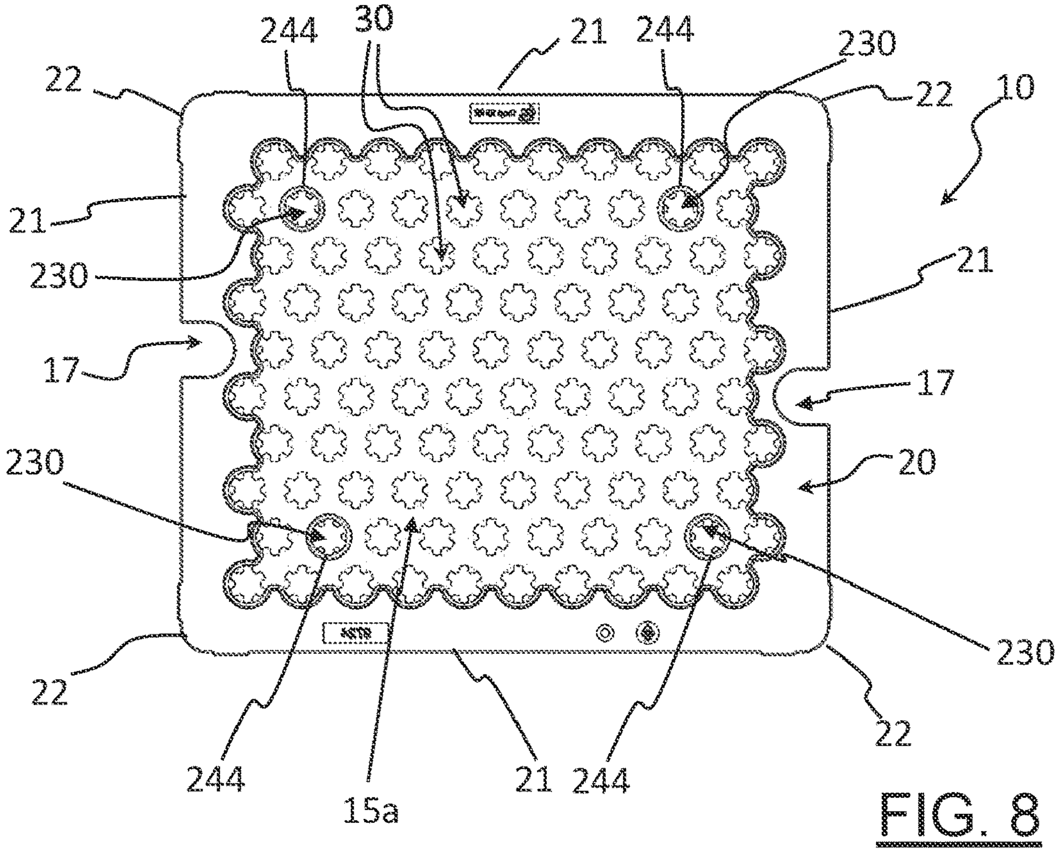
FIG. 8 is a plan bottom view of the support device of FIG. 7.
Figure 9:
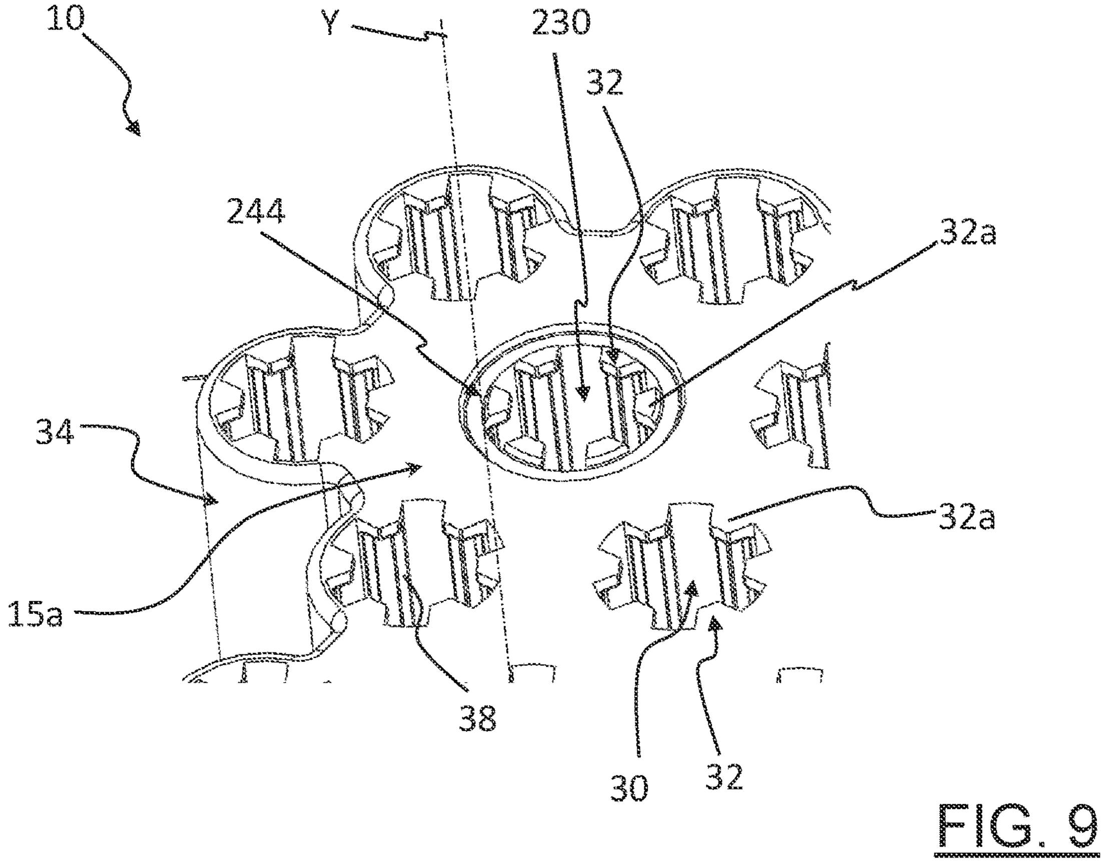
FIG. 9 is a schematic perspective bottom view and on an enlarged scale of a portion of the support device of FIG. 6.

A further embodiment of a support device 10 in accordance with the present disclosure is shown in FIGS. 7-9. Parts and components that are identical or analogous to those of the support device 10 of FIGS. 1-4 are indicated by the same reference numeral and for their description reference is made to the above description.

Looking at the plate 20 of the support device 10 of FIGS. 7-9 from above, it can be noted that it differs from the support device 10 of FIGS. 1-4 both in the arrangement of the housing seats 30, which in this case is staggered like a honeycomb or checkerboard, and in the stacking elements 240, which in this case are defined by end edges 235 of housing seats 230 projecting above the end edges 35 of the other housing seats 30 of the plate 20.

The housing seats 230 differ from the other adjacent housing seats 30 only in that their upper portion 234*b* of their side wall 234 has an extension greater than that of the upper portion 34*b* of the side wall 34 of the other housing seats 30.

The centering ribs 38 of the housing seats 230 are identical to the centering ribs 38 of the housing seats 30, whereby the centering ribs 38 of the housing seats 230 do not reach the end edges 235 of the housing seats 230.

The housing seats 230 are four, arranged near two opposite sides 21 of the plate 20 in a substantially symmetrical manner with respect to a transverse centreline plane of the plate 20.

Looking at the plate 20 of the support device 10 of FIGS. 7-9 from below, it can be noted that it differs from the support device 10 of FIGS. 1-4 also in that a plurality of annular-shaped recesses 244 are made on the lower surface 15*a* of the plate 20.

The recesses 244 are four and are arranged at the four housing seats 230.

Each recess 244 extends circumferentially around the base 32 of the respective housing seat 230. Each base 32 of the housing seats 230 is identical to the base 32 of the housing seats 30 and comprises six rest elements 32*a* configured to support a respective cartridge. The lower face of the rest elements 32*a* of the housing seats 230 is defined on the lower surface 15*a* of the plate 20. The depth of the recesses 244 is lower than the thickness of the rest elements 32*a*.

The four recesses 244 are configured to house the end edges 235 of another support device 10 identical to that of FIGS. 7-9 so as to stack those two support devices 10.

Figure 10:
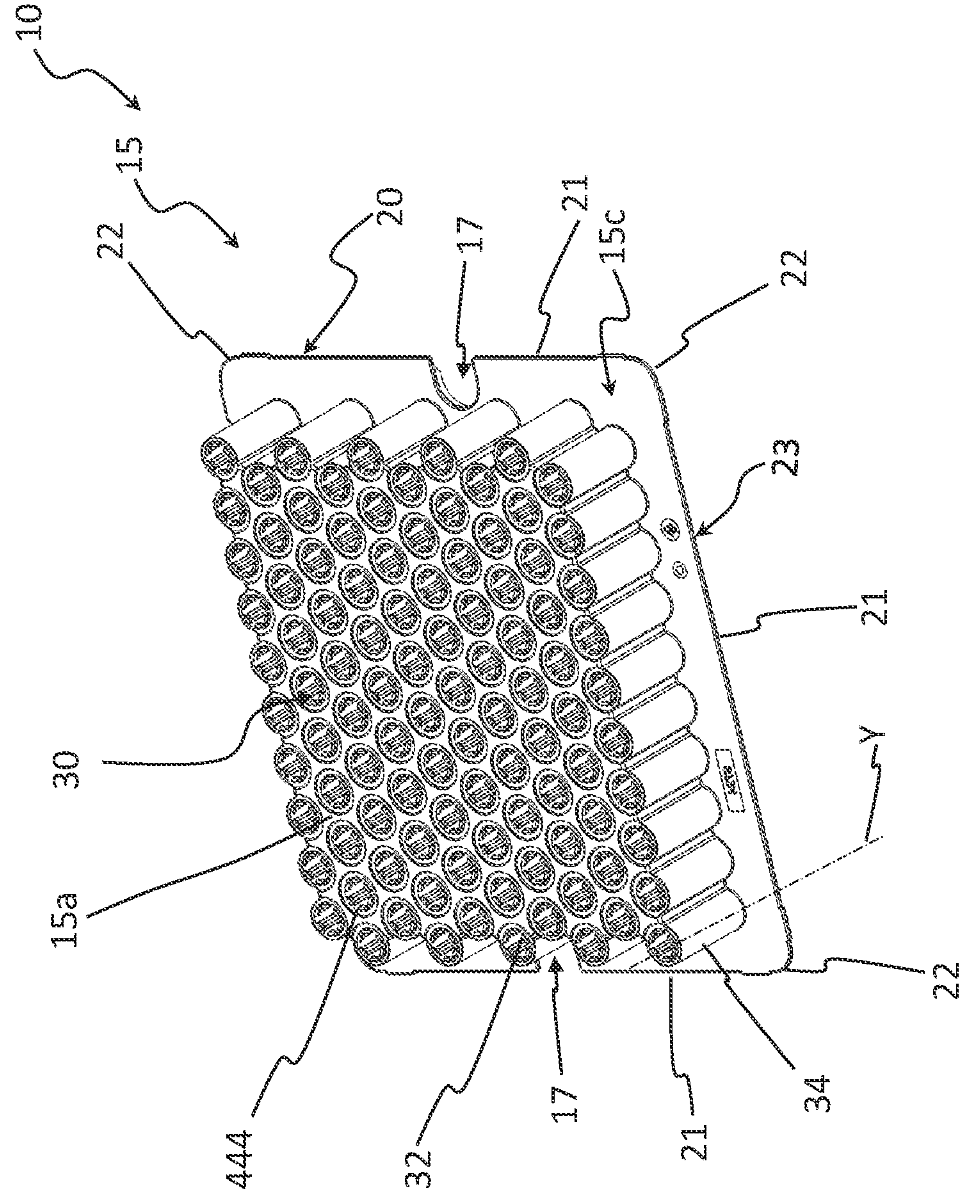
FIG. 10 is a schematic perspective bottom view of a further embodiment of a support device.

A further embodiment of a support device 10 in accordance with the present disclosure is shown in FIG. 10. Parts and components that are identical or analogous to those of the support device 10 of FIGS. 1-4 are indicated by the same reference numeral and for their description reference is made to the above description.

The support device 10 of FIG. 10 differs from the support device 10 of FIGS. 1-4 in that the stacking elements 40 are not provided and in that annular-shaped recesses 444 totally analogous to the recesses 244 of FIGS. 8 and 9 are made at all the housing seats 30.

Each base 32 of the housing seats 30 of FIG. 10 is identical to the base 32 of the housing seats 30 of FIGS. 1-4. Thus, the lower face of the base 32 of the housing seats 30 of FIG. 10 is defined on the lower surface 15*a* of the plate 20.

The recesses 444 are configured to house the end edges 35 of a support device 10 identical to that of FIG. 10 so as to stack said two support devices 10. The support device 10 provided with the abovementioned recesses 444 can therefore be arranged above or below another support device 10 of the same type.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

What is claimed is:

1. A support device for supporting a plurality of containers for pharmaceutical use to be handled in a processing line, comprising:

a plate having a plurality of housing seats;

wherein each housing seat comprises:

a base; and a side wall extended from the base along a longitudinal direction;

wherein the base comprises at least three rest elements projecting inwardly in said housing seat and equally spaced from each other;

wherein the side wall comprises a plurality of centering ribs extending along the longitudinal direction and projecting inwardly in the housing seat; and wherein the plurality of centering ribs comprises a pair of centering ribs arranged only above each of said at least three rest elements wherein each centering rib is connected with the respective rest element.

2. The support device of claim 1, wherein each of the three rest elements comprises:

a first side connected to the side wall;

a second side arranged inside the housing seat in a distal position with respect to the side wall;

two opposite third sides connecting the first side with the second side; and wherein each centering rib of each pair of centering ribs is arranged at a respective third side of the respective rest element.

3. The support device of claim 1, wherein a free end of each centering rib distal from the respective rest element has a tapered portion.

4. The support device of claim 1, wherein the centering ribs extend on opposite sides with respect to the plate.

5. The support device of claim 1, wherein there are four rest elements and four pairs of centering ribs.

6. The support device of claim 1, wherein there are six rest elements and six pairs of centering ribs.

7. The support device of claim 1, wherein the plate further comprises a flat surface which is perforated adjacent each housing seat and wherein the longitudinal direction is substantially orthogonal to the flat surface.

8. A support device for supporting a plurality of containers for pharmaceutical use to be handled in a processing line, comprising:

a plate having a plurality of housing seats;

wherein each housing seat comprises:

a base having at least six rest elements projecting inwardly in the housing seat, wherein the at least six rest elements are equally spaced from each other; and a side wall extended from the base along a longitudinal direction, wherein the side wall comprises at least six pairs of centering ribs extending along the longitudinal direction and projecting inwardly in the housing seat; and wherein the at least six pairs of centering ribs are arranged only above said at least six rest elements.

* * * * *